(12) United States Patent
Jilken

(10) Patent No.: US 8,695,298 B2
(45) Date of Patent: Apr. 15, 2014

(54) ENERGY SUPPLYING DEVICE

(76) Inventor: Leif Anders Jilken, Kalmar (SE)

( * ) Notice: Subject to any disclaimer, the term of this patent is extended or adjusted under 35 U.S.C. 154(b) by 515 days.

(21) Appl. No.: 12/664,333

(22) PCT Filed: Jun. 11, 2008

(86) PCT No.: PCT/SE2008/000387
§ 371 (c)(1),
(2), (4) Date: Dec. 11, 2009

(87) PCT Pub. No.: WO2008/153469
PCT Pub. Date: Dec. 18, 2008

(65) Prior Publication Data
US 2010/0180524 A1   Jul. 22, 2010

(30) Foreign Application Priority Data

Jun. 11, 2007 (SE) .................................... 0701395

(51) Int. Cl.
*F24J 2/04* (2006.01)
*E04B 2/14* (2006.01)
*E04F 17/00* (2006.01)
*F24J 2/24* (2006.01)

(52) U.S. Cl.
CPC . *E04B 2/14* (2013.01); *E04F 17/00* (2013.01); *F24J 2/242* (2013.01)
USPC ............................ 52/302.3; 126/704; 126/714

(58) Field of Classification Search
USPC ........... 52/302.1, 302.3, 302.4; 126/669, 704, 126/714
See application file for complete search history.

(56) References Cited

U.S. PATENT DOCUMENTS

| | | | | |
|---|---|---|---|---|
| 3,503,165 A | * | 3/1970 | Hardt | 52/125.5 |
| 4,114,597 A | * | 9/1978 | Erb | 126/665 |
| 4,723,598 A | * | 2/1988 | Yoshio et al. | 165/136 |
| 5,415,155 A | * | 5/1995 | Cohen et al. | 126/663 |
| 5,509,246 A | * | 4/1996 | Roddy | 52/533 |
| 5,645,045 A | * | 7/1997 | Breslin | 126/669 |
| 5,740,858 A | * | 4/1998 | Ingram | 165/56 |
| 5,758,456 A | | 6/1998 | Case | |
| 5,788,152 A | * | 8/1998 | Alsberg | 237/69 |
| 6,079,170 A | * | 6/2000 | Slebos | 52/220.1 |
| 2008/0010924 A1 | | 1/2008 | Pietruczynik et al. | |

FOREIGN PATENT DOCUMENTS

EP   0 879 996 A1   11/1998
WO   WO 02/35029 A1   5/2002

OTHER PUBLICATIONS

International Search Report dated Sep. 11, 2008, issued in corresponding international application No. PCT/SE2008/000387.
Notification Concerning Transmittal of International Preliminary Report on Patentability, Written Opinion of the International Searching Authority (dated Sep. 11, 2008), International Preliminary Report on Patentability (dated Dec. 11, 2009), 11 pages total.

\* cited by examiner

*Primary Examiner* — William Gilbert
(74) *Attorney, Agent, or Firm* — Ostrolenk Faber LLP

(57) ABSTRACT

An energy supplying device for energy collection, energy transfer, energy release, cooling, and storing energy, is described. The device has an elongated cavity is produced by extrusion of a profile. The cavity provides space for a medium to circulate and is enclosed by a wall, floor or roof formation. This formation constitutes at least part of an actively supporting structure for direct or indirect mechanical support of loads, while at the same time forming at least one part of a structural element, for example, a house roof, a wall, a board, a bridge, a pier, a road, a pavement, a terrace or balcony and may be an I-, L-, O-, T-, U-, V-, X-, Y- or Z-beam.

12 Claims, 3 Drawing Sheets

US 8,695,298 B2

ENERGY SUPPLYING DEVICE

CROSS REFERENCE TO RELATED APPLICATIONS

The present application is a 35 U.S.C. §371 National Phase conversion of PCT/SE2008/000387, filed Jun. 11, 2008, which claims benefit of Swedish Application No. 0701395-6, filed Jun. 11, 2007, the disclosure of which is incorporated herein by reference. The PCT International Application was published in the English language.

BACKGROUND OF THE INVENTION

The present invention relates to an energy supplying device intended to be used for the collection, transfer, storage, cooling and release of energy. The energy supplier has elongated cavities produced by extruding a profile in one direction of extrusion by a tool. The cavities then provide space for a medium such as air or fluid to absorb or release energy to/from the energy supplier. According to the invention the cavities are enclosed by wall, floor and roof formations, which constitute an actively supporting structure designed actively to support structural elements, whilst at the same time forming part of the energy supplier.

In the case of structures of the type in question now on the market, simple energy suppliers are used to collect, transport, release and store energy. Solar collectors of different types that have cavities, e.g. simple extruded profiles such as plastic hoses, are placed on different structural elements to absorb cheap solar energy for storage during the summer in colder countries, and all year round in warmer, sunny countries, and when are then emptied in the form of heated water. The water or another medium may also circulate in the cavities by means of a pump or by self-circulation for the absorption and release of energy. Furthermore, colder water may circulate in the energy supplier to cool different premises. The problem with these structures is that they must be anchored in structural elements such as house roofs, walls, boards etc, which have supporting characteristics, which cost extra and are not aesthetic because they project from the structural element. The energy supplier must then be anchored in the structural elements with expensive fastening structures, which are not aesthetic, take up space, require openings and give rise to leaks in the structural elements. The energy supplier becomes heavy when filled with water, which is why the structural element must be strengthened to be above to support this extra load. Moreover, it is not possible to arrange today's energy suppliers on roads, bridges, bridges, terraces, balconies etc, since they are unable actively to support loads from people and vehicles without malfunctioning.

SUMMARY OF THE INVENTION

One object of the present invention is to eliminate the disadvantages from which the above-mentioned structures suffer by enclosing the cavities in the energy supplier containing the medium, e.g. by a wall, floor or room formation, to form an actively supporting structure which mechanically supports and constitutes entire structural elements or parts of different structural elements, e.g. a house roof, a wall, a board, bridge, a pier, a road, a pavement, a terrace or a balcony, whilst at the same time acting as part of the energy supplier.

Thanks to the invention an energy supplier has now been provided, which has the characteristic of actively supporting loads and forming part of different structural elements and which is at the same time able to collect and release solar energy as a solar collector and be an energy emitter, such as a radiator, but also sometimes constitute a store of energy, such as an accumulator tank, as well as being able to cool premises with cold water circulating in a number of energy supplier. This is achieved in that the energy supplier is produced by extrusion in a tool in one extrusion direction to form an elongated profile having elongated cavities, which extend in the direction of extrusion. The cavities provide space for a medium such as air or fluid to circulate through or be stored in. According to the invention the cavities are enclosed by a formation constituting, for example, a wall, floor or roof formation which forms part of an actively supporting structure for mechanically supporting part of a structural element, e.g. a house roof, a wall, a board, a bridge, a pier, a road, a pavement, a terrace or a balcony. This creates an actively supporting structure in the energy supplier, which at the same time constitutes part of the structural element, where statically the supporting structure is the strongest part of the energy supplier for absorbing loads mainly transversely to the direction of extrusion. In a preferred embodiment of the invention the supporting structure has a beam formation in an imaginary section transverse to the direction of extraction, which beam formation is statically dimensioned to resist predetermined loads. The beam formations are then constructed in the form, for example, of I-, L-, O-, T-, U-, V-, X-, Y- or Z-beams. This then constitute the entire profile or part of the profile, which is assembled together with longitudinal intermediate elements or constructed as a separate element consisting of a separate profile without the supporting function of the beam formation. The separate element may then be extruded in a light-transparent plastic material, which readily admits solar energy. It is simplest and cheapest to extrude entire profiles that are black or dark in colour in order to absorb solar energy effectively in recycled plastic and/or rubber material, for example, with or without reinforcing fibres incorporated. The energy supplier is produced as an elongated box formation with a number of elongated cavities extending in parallel and arranged adjacent to one another, long side against long side. The energy collector is filled with the medium via an inlet and drained off via an outlet. During circulation between a number of energy suppliers this takes place via the inlets and outlets in a closed system. The box formation has an underside, two long sides, an upper side and two opposite ends. The thickness of the box formation is then considerably smaller than its length and width. The underside and upper side consist of parts of the beam formations, with or without intermediate fixed or detachable elements. Parts of the upper side create exposure surfaces for the absorption/release of energy via the medium. The exposure surface is constructed as a thin wall approx. 2-16 mm thick, which faces towards surrounding outside air present there, outside the energy supplier, and against the solar energy, the thin wall enabling the medium to absorb or release the energy more easily than the actively supporting part, which is thicker. In order to improve efficiency still further, when the energy supplier acts as a solar collector, the elongated cavities are provided with a heat insulating layer to reduce energy circulation through the bottom, near the wave formations facing the bottom. The heating insulating layer consists, for example, of frigolite, rock wool, glass wool, which is protected with a sealing layer facing the medium in the form of water, against the action of the medium. The profiles are extruded in long lengths and cut into predetermined lengths. The open ends are sealed with sealing elements. To allow circulation and ensure that all the cavities can be filled with the medium, communication is created between the cavities transversely to the direction of extrusion either in the sealing elements or via an opening in the enclosing formation. The ends which are not sealed by sealing elements constitute openings that can be linked together with other openings that lead into the cavities or via an opening that exists in the long side, the bottom or the upper side, the medium being caused to circulate round, or stored in, a number of energy suppliers linked together. In order to be able to use the energy suppliers in a context in which the structural elements are flat, e.g. on roofs, boards, planks, piers, bridges, roads, etc., the bottom and upper side are made flat and parallel. The profiles are then extruded with rebates/folds arranged in the respective long sides to resemble a board, with its joining function, or to constitute folded supports facing each other so that the structural element can be built up. Energy suppliers having elongated cavities adjacent to one another, and having a volume per meter of length that holds a quantity of fluid of approx. 5-20 liters, preferably water, are required when the energy supplier is to receive solar energy with an intensity of between 800 and 2000 W/m$^2$, depending on where it is located, in order to provide a good energy exchange. The energy is then absorbed on a number of energy suppliers arranged outside and extending a total of approximately 100-500 m, facing each other directly or indirectly and together containing circulating water of approx. 2-5 m$^3$. They transfer, store and release the energy indoors on a second series covering the approximately 100-500 meters, which means that no accumulator tank is required. The only thing that may be required is a circulation pump, but self-circulation may also be sufficient.

The most significant advantages of the invention are therefore that a very simple, cheap, aesthetically attractive and easily maintained energy supplier has been provided which, at predetermined points, has actively supporting structures for supporting and forming part of structural elements, which is why no fittings or reinforcements are required. Instead assembled energy suppliers constitute the structural element itself, which can then be produced from re-used polymers such as plastic and rubber.

The invention is described more in detail below by means of some preferred embodiments and with reference to the attached drawings, in which

DESCRIPTION OF PREFERRED EMBODIMENTS

Figure 1:
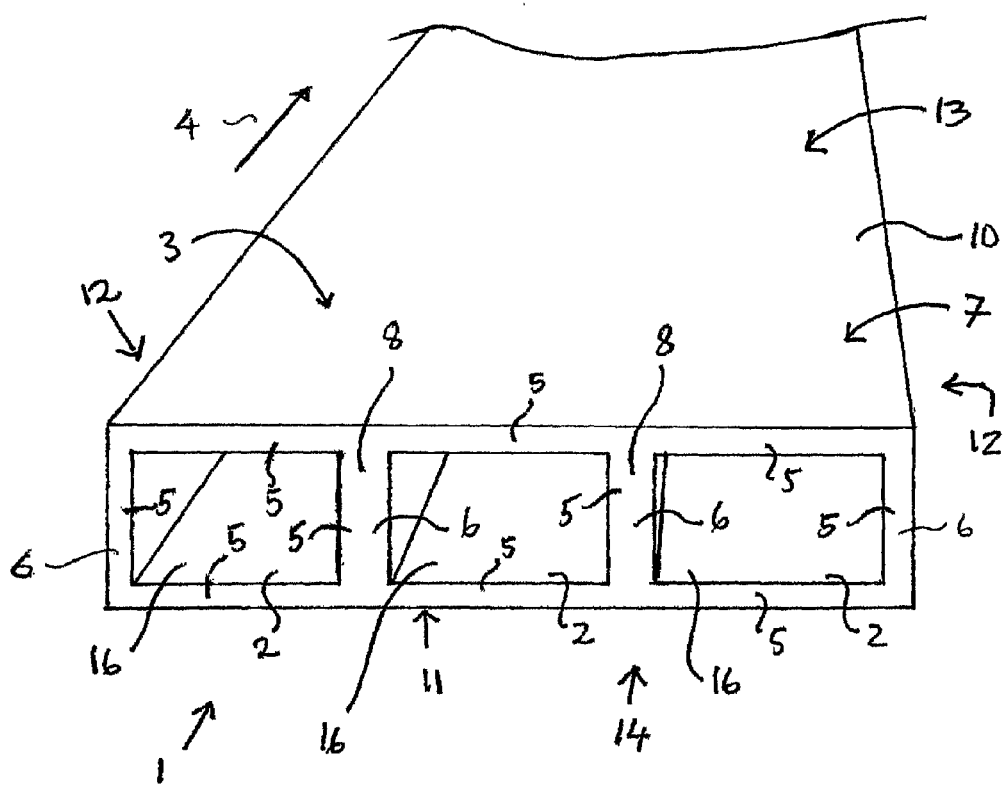
FIG. 1 shows a perspective view of a part of an energy supplier.
Figure 2:
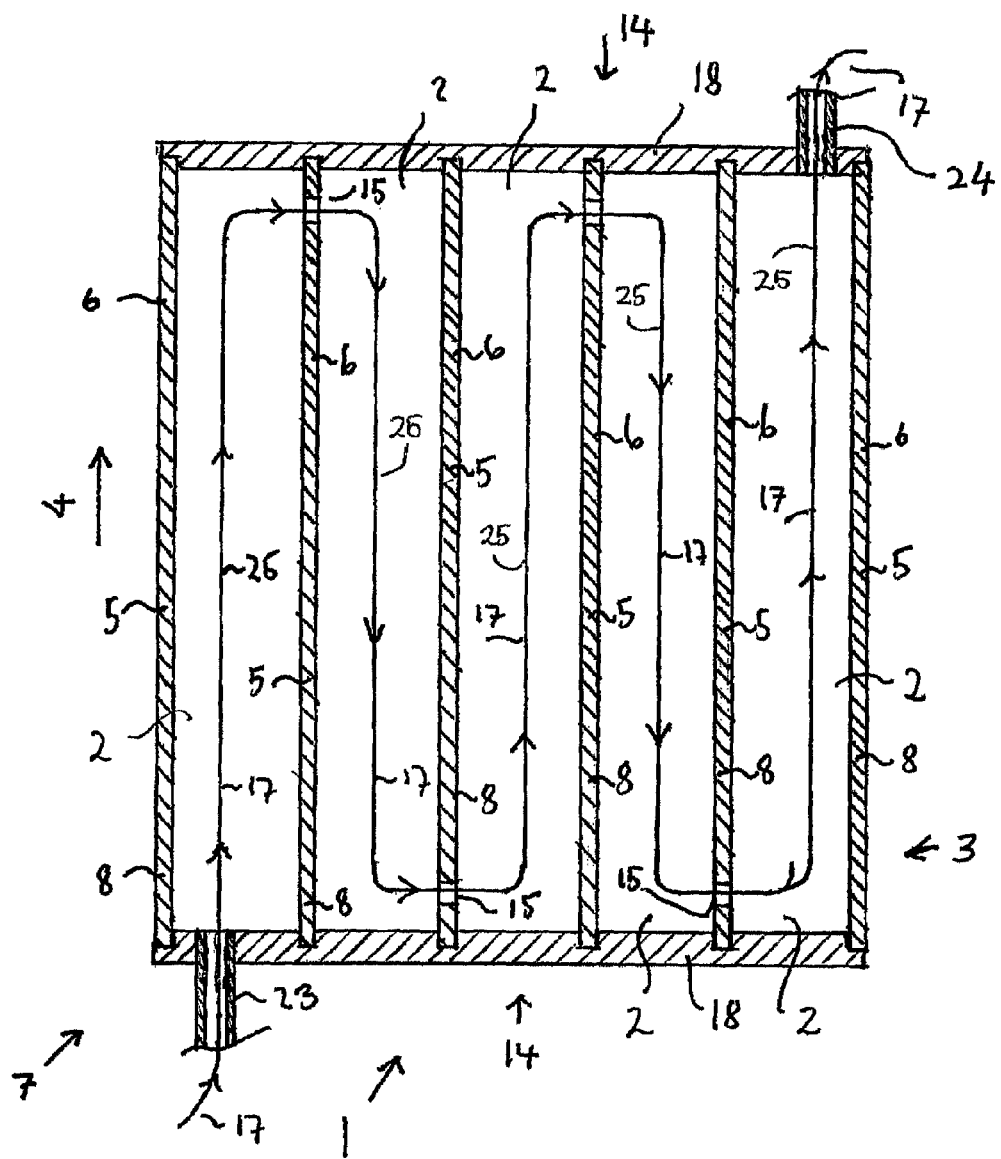
FIG. 2 shows a horizontal section through a part of an energy supplier in a direction of extrusion.

As can be seen from FIGS. 1 and 2, an energy supplier 1 is illustrated, which has a number of elongated cavities 2 produced by extruding a profile 3 in a direction of extrusion 4. Cavities 2 provide space for a medium 17, such as water, to circulate or be stored in the energy supplier 1. Each cavity 2 is enclosed by wall, floor or roof formations called formations 5, which constitute part of an actively supporting structure 6 in order to support loads and constitute the entire or part of a structural element 7. In one embodiment, where only one cavity 2 is arranged in the energy supplier 1, this preferably extends in circular formations. The energy supplier 1 itself consists of an elongated box formation 10, having an underside 11, two long sides 12, an upper side 13 and two opposite ends 14.

As can be seen from FIG. 2, the elongated cavities 2 are arranged close to one another. Medium 17 is poured in through an inlet 23 and is drained off through an outlet 24, constituting hoses/pipes 25 for filling/draining/circulation of medium 17. The ends 14 have openings 16, which are sealed by sealing elements 18. Elongated cavities 2 are arranged adjacent to one another and have a communication for medium 17 between them via openings 15 in enclosing formations 5.

Figure 3:
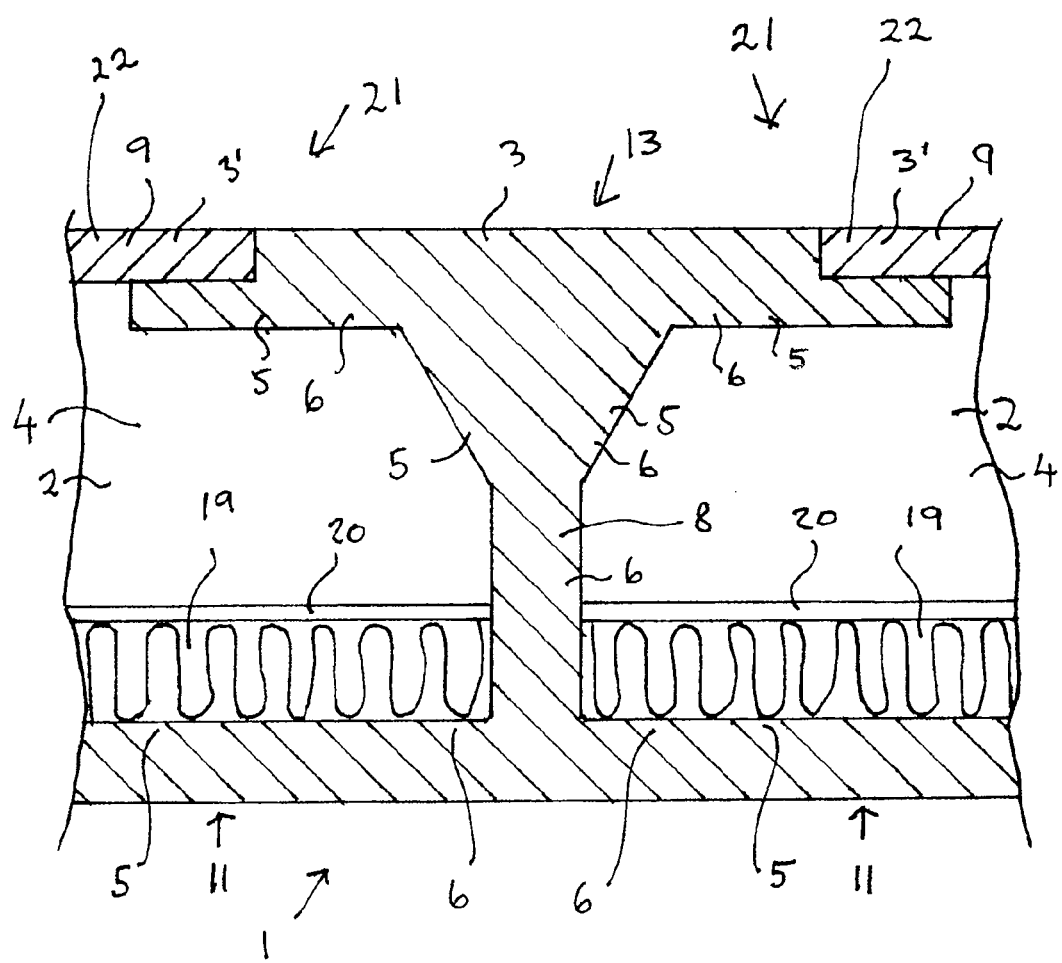
FIG. 3 shows a vertical cross-section transverse to a direction of extrusion of an energy supplier in a beam formation.

As can be seen in FIG. 3, the actively supporting structure 6 is illustrated such as in an imaginary section resembling a beam formation 8, constructed as a "Y" connecting to longitudinal separate elements 9, which also consist of profiles 3'. The bottom formations of elongated cavities 2 are lined with a heat insulating layer 19 to reduce energy circulation through the bottom 11. Heat insulating layer 19 is protected from the action of the fluid with a sealing layer 20. Upper side 13 has an exposure surface 21, constructed as a thin wall 22 for effectively absorbing or releasing the energy, and which is designed as profiles 3' constituting the intermediate elements 9, which may be detachable and replaceable, and produced from a light transparent plastic or have the form of a separate glass pane.

What is claimed is:

1. An energy supplying device for energy collection, energy transfer, and storing energy, the energy supplying device comprising:

a self-supporting elongated substantially hollow profile comprising at least one wall formation defining the substantially hollow profile into at least one first elongated cavity produced by extrusion of the profile, the first cavity having a longitudinal extent in a direction of the extrusion, the first cavity configured to provide space for at least one medium, the medium being air or fluid, to be circulated or to be stored in the energy supplying device;

the at least one wall formation comprising plastic or rubber material with reinforcing fibers incorporated, the at least one wall formation configured as an actively supporting structure positioned to support loads and at the same time configured as a part of a structural element, and the at least one wall formation including at least one opening configured to provide communication for the at least one medium; and the actively supporting structure has a section transverse to the direction of extrusion, the section comprising at least one beam formation constructed as an I-beam, T-beam, V-beam, X-beam or Y-beam, the beam formation comprising an entirety or a part of the elongated profile and configured to be assembled with at least one intermediate element arranged separately in the direction of extrusion;

an elongated box formation having a second elongated cavity extending parallel to the at least one first elongated cavity;

wherein the medium is at least circulated in the at least one first elongated cavity and in the second elongated cavity;

an inlet to the device configured to receive the medium into the device and an outlet from the device configured to drain off the medium from the device while circulation is taking place in a closed circulating system;

the box formation has an underside, two long sides, an upper side and two opposite ends; a thickness of the box formation is smaller than its length and width; the underside and the upper side comprise parts of the beam formation and elements for creating exposure surfaces for absorbing or releasing the energy via the medium;

a heat insulating layer positioned to line the first and second cavities and configured to reduce energy circulation through the bottom at its wall formations, said heat insulating layer comprising frigolite, rock wool or glass wool; and a sealing layer configured to protect the heat insulating layer against action of the medium.

2. The device according to claim 1, wherein at least part of the upper side is part of the formation and comprises a roof formation comprising part of the exposure surface constructed as a thin wall approximately 2-16 mm thick, which faces surrounding outside air and/or solar energy existing outside the energy supplier, wherein the thin wall releases or absorbs the energy more easily than the active supporting structure.

3. The device according to claim 1, wherein at least one end is sealed by at least one sealing element, which at least two elongated cavities alongside one another has a communication for the medium between them via at least one opening in the enclosing formation or at least one of the sealing elements.

4. The device according to claim 1, further comprising:

a second energy supplier physically linked directly or indirectly to the energy supplying device, the second energy supplier having at least one opening leading into a cavity of the second energy supplier, wherein the medium is caused to circulate in or be stored in the two energy suppliers.

5. The device according to claim 4, wherein the second energy supplier is linked to the energy supplying device via at least one of an end of the second energy supplier device or an end of energy supplying device.

6. The device according to claim 1, wherein the bottom and the upper side are essentially flat and parallel, and in the energy supplying device at least one profile or at least one element is constructed with a groove and tongue arranged in the respective long sides to resemble a board with its function of joining one another.

7. The device according to claim 1, wherein the elongated cavities in the energy supplying device have a volume of 5-20 liters per meter of length for holding a quantity of the medium, wherein the energy supplying device is configured to receive solar energy of between 800 and 2000 W/m$^2$ on a part of together about 100-500 m positioned over the at least one elongated cavity, the medium circulating with energy absorption of approximately 2-5 m$^3$, wherein the transfer, storage and release of energy on a remaining 100-500 meters take place by means of at least one circulation pump and/or of self-circulation without a separate accumulator tank.

8. The device according to claim 1, wherein the elongated cavity is continuous with the second elongated cavity, the device further comprising hoses or pipes positioned in and through the continuous cavities.

9. The device according to claim 1, wherein the actively supporting structure is configured as a roof of a building.

10. The device according to claim 1, wherein the at least one wall formation has a predetermined wall thickness and is positioned and configured to support loads directed principally transversely to the direction of extrusion.

11. The device according to claim 10, wherein the profile is extruded using a tool.

12. An energy supplying device for energy collection, energy transfer, and storing energy, the energy supplying device comprising:

a self-supporting elongated substantially hollow profile comprising at least one wall formation defining the substantially hollow profile into at least one elongated cavity produced by extrusion of the profile, the cavity having a longitudinal extent in a direction of the extrusion, the cavity configured to provide space for at least one medium, the medium being air or fluid, to be circulated or to be stored in the energy supplying device;

the at least one wall formation comprising an actively supporting structure positioned to support loads and at the same time configured as a part of a structural element, and the at least one wall formation including at least one opening configured to provide communication for the at least one medium;

the actively supporting structure has a section transverse to the direction of extrusion, the section comprising at least one beam formation constructed as an I-beam, T-beam, V-beam, X-beam or Y-beam, the beam formation comprising an entirety or a part of the elongated profile and configured to be assembled with at least one intermediate element arranged separately in the direction of extrusion;

an elongated box formation having a second elongated cavity extending parallel to the at least one elongated cavity, wherein the medium is circulated in the elongated cavity and in the second elongated cavity;

an inlet configured to receive the medium into the device and an outlet configured to drain off the medium from the device while circulation is taking place in a closed circulating system;

the box formation having an underside, two long sides, an upper side and two opposite ends, wherein a thickness of the box formation is smaller than its length and width, wherein the underside and the upper side comprise parts of the beam formation and elements for creating exposure surfaces for absorbing or releasing the energy via the medium;

a heat insulating layer positioned to line the cavities and configured to reduce energy circulation through the bottom at its wall formations, said heat insulating layer comprising frigolite, rock wool or glass wool; and a sealing layer configured to protect the heat insulating layer against action of the medium.

* * * * *

UNITED STATES PATENT AND TRADEMARK OFFICE
CERTIFICATE OF CORRECTION

PATENT NO. : 8,695,298 B2  
APPLICATION NO. : 12/664333  
DATED : April 15, 2014  
INVENTOR(S) : Leif Anders Jilken Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 588 days.

Signed and Sealed this

Twenty-ninth Day of September, 2015

Michelle K. Lee
*Director of the United States Patent and Trademark Office*